(12) United States Patent
Lillard, Jr.

(10) Patent No.: US 8,763,918 B2
(45) Date of Patent: Jul. 1, 2014

(54) CONTAINER FOR IMPROVED BEVERAGE IDENTIFICATION SYSTEM AND METHOD OF USE THEREOF

(75) Inventor: Donald W. Lillard, Jr., Lake Zurich, IL (US)

(73) Assignee: Insight Beverages, Inc., Lake Zurich, IL (US)

( * ) Notice: Subject to any disclaimer, the term of this patent is extended or adjusted under 35 U.S.C. 154(b) by 0 days.

(21) Appl. No.: 13/412,912

(22) Filed: Mar. 6, 2012

(65) Prior Publication Data

US 2013/0233914 A1    Sep. 12, 2013

(51) Int. Cl.
*G06K 19/06* (2006.01)

(52) U.S. Cl.
USPC .......................................... 235/494; 235/385

(58) Field of Classification Search
USPC .............. 235/462.01, 375, 385, 494; 206/534
See application file for complete search history.

(56) References Cited

U.S. PATENT DOCUMENTS

| | | | |
|---|---|---|---|
| 4,065,343 A * | 12/1977 | Stumpe | 156/212 |
| 4,202,387 A | 5/1980 | Upton | |
| 4,419,573 A | 12/1983 | von Geldern | |
| 5,046,609 A * | 9/1991 | Mangini et al. | 206/232 |
| 5,390,711 A * | 2/1995 | Murphey | 141/1 |
| 5,481,100 A * | 1/1996 | Terauchi | 235/494 |
| 5,566,732 A | 10/1996 | Nelson | |
| 5,726,433 A * | 3/1998 | Peng | 235/462.36 |
| 5,738,153 A | 4/1998 | Gerling et al. | |
| 5,992,742 A | 11/1999 | Sullivan et al. | |
| 6,343,695 B1 * | 2/2002 | Petrick et al. | 206/534 |
| 6,564,999 B1 | 5/2003 | Saveliev et al. | |
| 6,572,016 B2 | 6/2003 | Saveliev et al. | |
| 6,578,763 B1 | 6/2003 | Brown | |
| 6,685,831 B2 | 2/2004 | Donig et al. | |
| 7,017,807 B2 * | 3/2006 | Kipp et al. | 235/385 |
| 7,083,093 B1 | 8/2006 | Brown | |
| 7,237,577 B1 | 7/2007 | Yacko et al. | |
| 7,380,717 B2 * | 6/2008 | Lubow | 235/462.01 |
| 7,439,859 B2 | 10/2008 | Humphrey | |
| 7,661,448 B2 | 2/2010 | Kim et al. | |
| 2003/0051767 A1 | 3/2003 | Coccaro et al. | |
| 2005/0029287 A1 | 2/2005 | Mobbs | |
| 2006/0064201 A1 | 3/2006 | Chirnomas | |
| 2009/0205747 A1 | 8/2009 | Lillard, Jr. | |

* cited by examiner

*Primary Examiner* — Jamara Franklin
(74) *Attorney, Agent, or Firm* — McCracken & Frank LLC

(57) ABSTRACT

A container for use in a system and method for dispensing a beverage is provided. The system includes a liquid dispensing machine having a dispensing area capable of receiving a container, and a scanner adjacent to the dispensing area for use with the container. The container is capable of being placed in the dispensing area and includes barcode indicia extending around an exterior surface of the container. The scanner can read the barcode indicia when the container is placed in the dispensing area at any rotational orientation relative to the scanner.

19 Claims, 14 Drawing Sheets

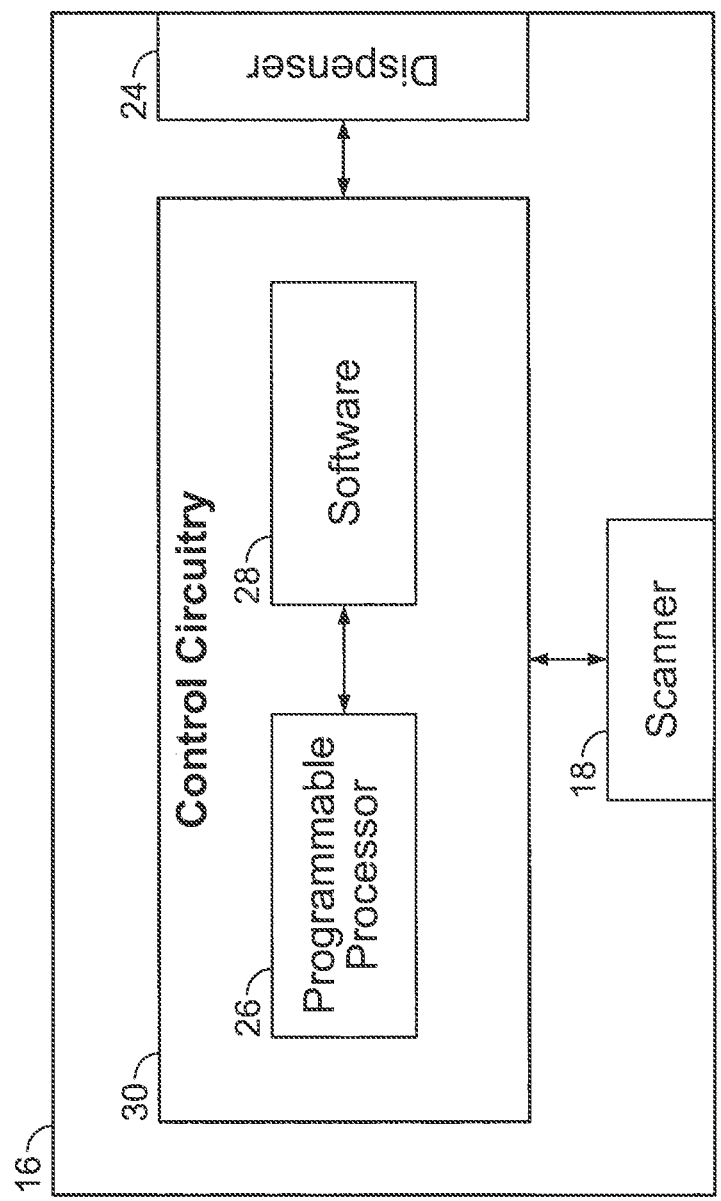

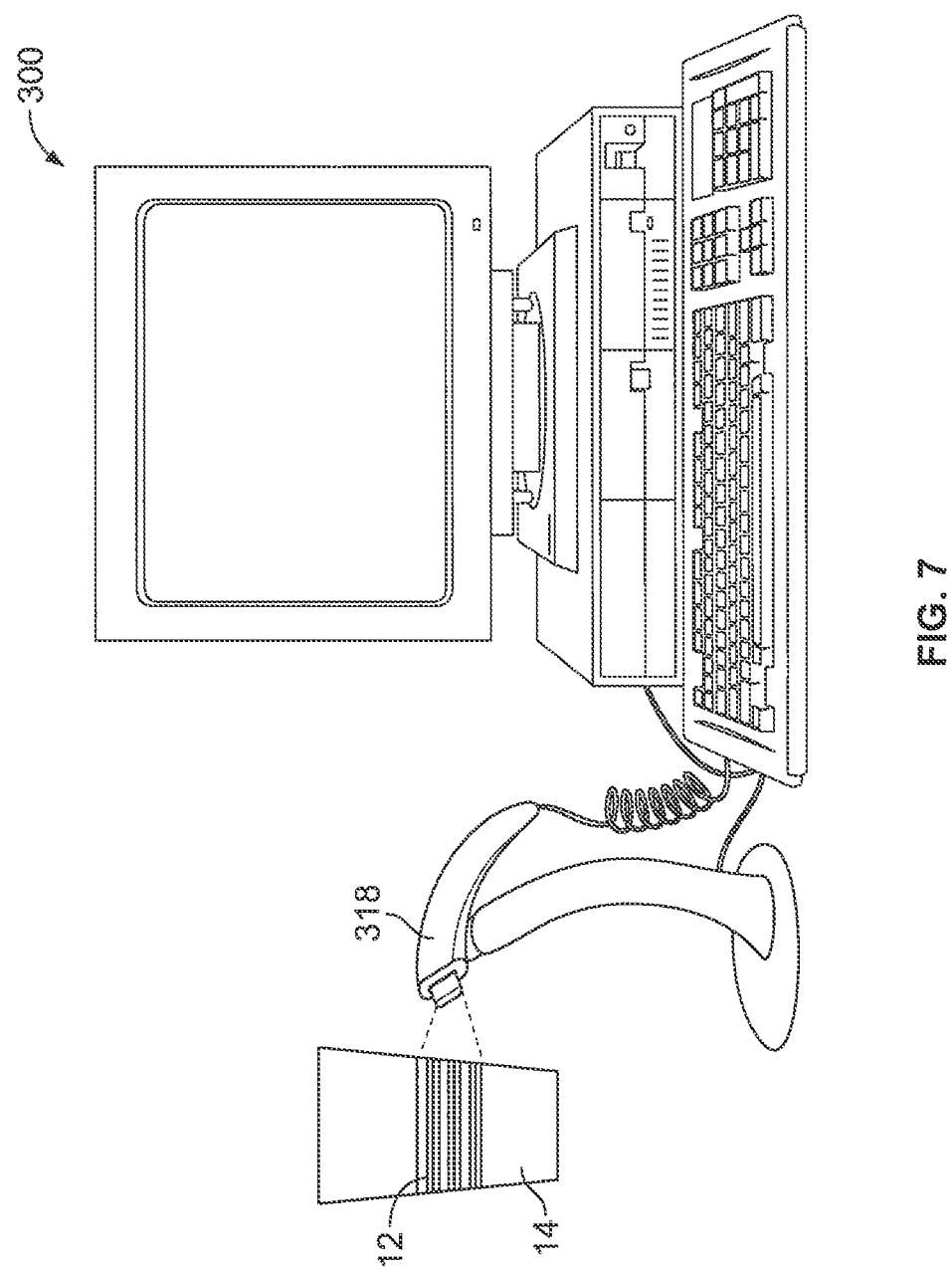

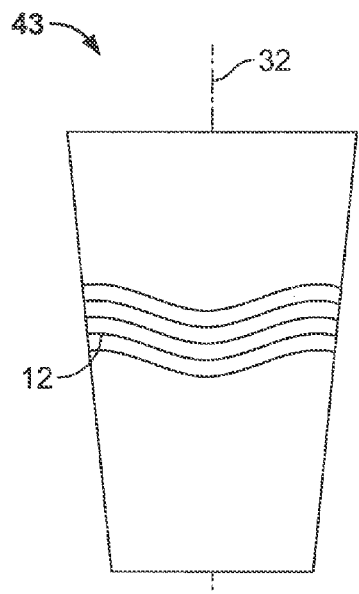
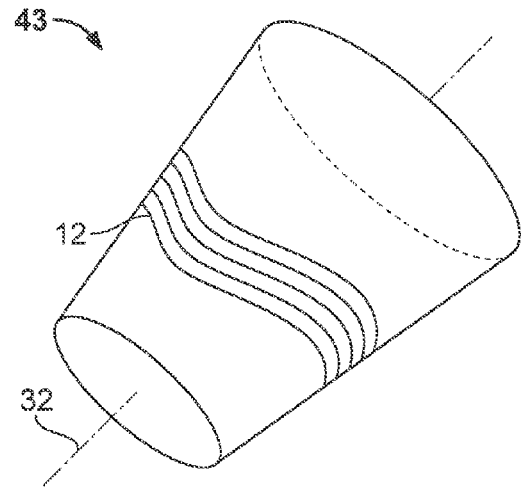
FIG. 11A
FIG. 11B
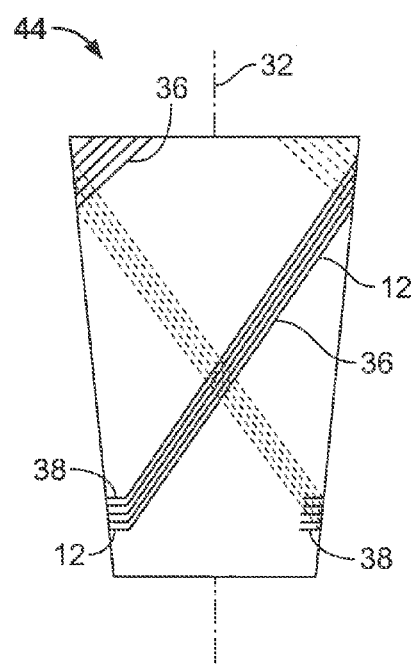
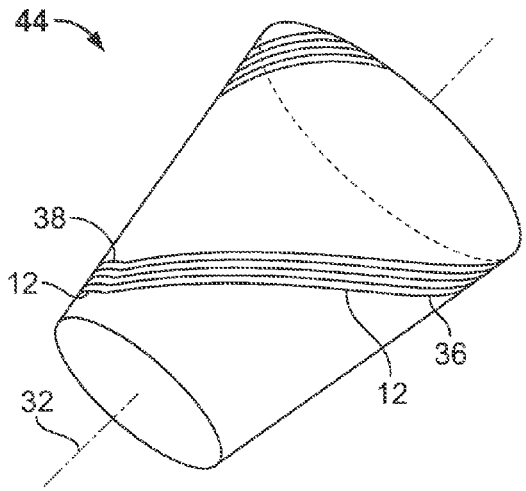
FIG. 12A
FIG. 12B

CONTAINER FOR IMPROVED BEVERAGE IDENTIFICATION SYSTEM AND METHOD OF USE THEREOF

CROSS REFERENCE TO RELATED APPLICATIONS

This patent application is related to, but does not claim the benefit of, U.S. Non-provisional application Ser. No. 12/370,782, filed Feb. 13, 2009, which claims the benefit of U.S. Provisional Patent Application No. 61/028,579 filed Feb. 14, 2008 titled "Improved Beverage Identification System."

FIELD OF INVENTION

The present invention relates generally to a container used with a system and method for identifying beverages in a vending situation. More particularly, the present invention relates to a beverage container that incorporates unique barcode indicia to identify the type and volume of beverage associated with a particular container in such a way that a beverage dispenser or cash register can read the barcode indicia with minimal manipulation of the beverage container.

BACKGROUND OF THE INVENTION

Traditionally, many convenience stores have sold beverages using a self-service arrangement in which the consumer uses an automated machine to dispense a desired beverage. The consumer can pay for his purchase by taking the container filled with his desired beverage to the register. Typical beverages dispensed in connection with these types of self-service arrangements can include coffee, specialty cappuccino or espresso drinks, cold drinks, and the like, for example.

When a consumer wants to purchase a beverage that is dispensed using a self-service arrangement, the consumer must first decide on the type and quantity of beverage to purchase. Then, the consumer must locate the appropriate cup or container, which may depend on the type and quantity of beverage selected. The consumer must appropriately position the cup or container relative to the dispensing machine and push a button or otherwise instruct the machine to dispense the selected beverage.

Once a consumer has appropriately filled a cup or otherwise caused the cup to be filled with the desired amount of the selected beverage, he must take the beverage to the cashier or vending location and then, depending on the type of cup used and the beverage held therein, verbally identify the type of beverage in the container to a store clerk. In many stores, the store clerk must manually enter the price of the consumer's purchase into the cash register machine to determine the total amount of money owed, including any other purchases and applicable taxes or fees, to allow the consumer to complete the purchase.

While self-service beverage dispensing arrangements offer some obvious advantages to both the consumer and the store, there are also disadvantages associated with such arrangements. For example, known self-service arrangements do not provide a system or method to charge a consumer different prices for different beverages unless the consumer voluntarily discloses his selected beverage. For example, cups for soda are generally different than cups for coffee, which are often different from cups for frozen drinks. However, a user can, either by mistake or on purpose, select the wrong cup for a particular beverage. Depending on the opacity of a cup and often its lid, it is often not possible to determine what beverage is in the cup. This permits a dishonest consumer to choose a more expensive beverage and report that he has a less expensive beverage to the cashier. Many stores and depots attempt to solve this problem by selling beverages based on only the amount of beverage purchased. That is, the size and type of the cup used in connection with a self-service dispensing machine determines the price. However, it may be advantageous for a store to sell certain premium beverages at a higher price point.

Furthermore, often there is little, if any, employee supervision over the self-service beverage dispensing process. Stores or depots that provide self-service beverage dispensing arrangements and machines are traditionally designed as low-cost profit centers. That is, often only one or two employees are working in the store at any given time, and the employees are often too busy totaling prices and accepting payment at the register to supervise a self-service beverage dispensing machine.

The lack of employee supervision can lead to opportunities in which a consumer obtains a higher priced beverage from a machine, but only pays for a lower priced beverage. The cups or containers used in connection with self-service beverage dispensing machines are often visually indistinguishable from one another regardless of what beverage is dispensed therein. Because different beverages can have various price points, often consumers will fill a cup with a high-cost beverage even though the cup is intended for a low-cost beverage. At the register, the consumer can then misinform the store clerk as to the cup's contents so that he or she incorrectly pays for the low-cost beverage. Such deception is deleterious to both the vendor and consumer as the losses sustained by the store must often be made up with higher prices that all must pay.

Another disadvantage associated with self-service beverage dispensing arrangements is the likelihood of a store clerk charging a consumer the wrong price. After a consumer verbally identifies the beverage dispensed into a container to a store clerk, the clerk must often manually enter the correct price into the register. There is a substantial likelihood that a clerk may enter the price erroneously, either inadvertently or intentionally.

Still further disadvantages include consumers drinking all or a portion of their beverage while they are still in the store and then improperly refilling their container before visiting the register to pay. When this happens, the consumers are essentially getting some or their entire beverage at the expense of the store owner. In response, a store owner may then raise the cost of beverages for all purchasers.

Finally, self-service beverage dispensing arrangements make it difficult to track inventory of particular beverages or to track consumer or seasonal trends that may be tied to particular beverages. However, it would be advantageous to a store to accurately track inventory and trends so that the store can be better prepared to meet the needs of its customers while not wasting unnecessary financial resources.

It is known in the art to identify and track particular beverages or containers by fastening certain indicia to or printing indicia on a cup or container. Far example, U.S. Pat. No. 5,378,153 to Gerling et al. titled "Measuring and Dispensing System for Solid Dry Flowable Materials" discloses a sensor that reads a sensor chip on the container when the sensor chip is appropriately aligned with the sensor. Similarly, U.S. Publication No. 2005/0029287 to Mobbs titled "Beverage Dispensing System" discloses a machine sensor that recognizes a barcode marked on a container when the container is situated such that the barcode is in view of the sensor. A container may have a traditional barcode Where the barcode indicia extend a short distance vertically on the outside of the container, as depicted for example in FIGS. 1a and 1b. Some containers also have traditional barcode indicia on the container base, as depicted for example in FIG. 1c. Alternatively, a container may have a traditional barcode that is rotated ninety degrees so that the barcode indicia curve a short way around the container in the horizontal, rather than vertical, direction, as depicted for example in FIG. 2a. More recently, containers have been introduced with special QR barcodes, as depicted for example in FIG. 2b. In Gerling et al., Mobbs, and other disclosures of such systems, the container must be placed in a specified position and aligned in a specific way with a scanning and dispensing machine so that the machine can recognize the marking, chip, or barcode associated with the container.

It has been found that consumers have had difficulty with these types of identification or tracking devices because it is often difficult to precisely place the container in position relative to the scanning and dispensing machine. Often, even when a consumer manages to accurately place the container in such a device, the container can be bumped or subsequently moved by the consumer, the force of the beverage being dispensed into the container, or another force that alters the alignment of the container with the machine. In these systems, when the container is not precisely aligned, the scanning and dispensing machine will often not recognize the container and will not dispense the desired beverage. This can cause great frustration to both consumers and store personnel attempting to assist consumers.

Accordingly, systems and methods have been developed in an attempt to address the frustrations consumers face when trying to precisely align a container with a scanning and dispensing machine. For example, U.S. Pat. No. 7,083,093 to Brown titled "Method and Apparatus for Vending a Containerized Liquid Product Utilizing an Automatic Self-Service Refill System" discloses a machine that includes a turntable on Which a container with marking indicia is placed. When a container is placed on the turntable, the turntable can rotate until a scanner associated with the machine reads the marking indicia on the container. That is, the turntable can rotate until the container is properly aligned with respect to the machine and its scanner.

The machine disclosed in Brown also presents several disadvantages. First, such a machine can be more expensive to manufacture and therefore to purchase. Typically a complex machine is more expensive to maintain relative to traditional self-service beverage dispensing machines because, among other reasons, the movable parts of the turntable and supporting machinery are more expensive to manufacture and are more prone to breakdown and the concomitant replacement and repair expenses. Second, a container placed on the turntable is more likely to spill or become misaligned with the beverage dispenser when the turntable is in motion. Clearly, it is preferable that a self service dispensing machine be inexpensive to manufacture and maintain and not predisposed to spill beverages.

U.S. Pat. No. 5,566,732 to Nelson titled "Beverage Dispenser With a Reader for Size Indicia on a Serving Container" discloses a bar code reader that reads a bar code printed on a container. Multiple bar codes can be printed on the container at several locations to make it easier to properly align the container with the machine and an associated bar code reader. However, a consumer must still work to ensure proper alignment and, as explained above, this can at times be a difficult and sometimes frustrating task. Additionally, the aesthetic design of a container with multiple bar codes printed thereon may not be desirable or preferable. There is thus a continuing, ongoing need for an improved beverage identification system and method.

SUMMARY OF THE INVENTION

According to one aspect of the present invention, a container for collecting liquid dispensed from a dispensing machine is provided wherein the container includes a receptacle and annular barcode indicia. The receptacle can be defined by interiors of a base and an annular wall and can the have an open end and a closed end. The annular barcode indicia can extend around an exterior surface of the annular wall and can be centered around a generally vertical axis of the container.

In preferred embodiments, the annular barcode can extend around at least one of a top, middle, or bottom portion of the annular wall. In other embodiments, the annular barcode can extend around substantially the entire vertical length of the annular wall. The annular barcode indicia can contain information related to at least one of container size, appropriate container contents, or pricing information. The annular barcode indicia can be printed on the exterior surface of the container or be removably affixed to the exterior surface of the container.

According to another aspect of the present invention, a method for using a container is also provided, including the step of placing the container in a dispensing area of a dispensing machine. The container may have annular barcode indicia extending around an exterior of the container and centered around a generally vertical axis of the container. The method further includes the step of having the annular barcode indicia scanned and evaluated by the dispensing machine, and receiving liquid in the container from the dispensing machine if and only if the container is determined to be appropriate for use with the dispensing machine based on the evaluation of the scanned annular barcode indicia. The barcode indicia may be scanned regardless of the rotational orientation of the container.

According to another aspect of the present invention, a container for collecting liquid dispensed from a dispensing machine is provided, wherein the container includes a receptacle and annular barcode indicia. The receptacle can be defined by interiors of a base and an annular wall and can the have an open end and a closed end. The annular barcode indicia are circumferentially placed around the middle portion of the container and are substantially perpendicular to the vertical axis.

BRIEF DESCRIPTION OF THE DRAWINGS

Various examples of objects, features and attendant advantages of the present invention will become fully appreciated as the same becomes better understood when considered in conjunction with the accompanying drawings, wherein:

FIG. 1b is a rotated isometric view of FIG. 2a;

FIG. 4 is a schematic representation of a beverage dispensing machine made in accordance with the teachings of the present invention.

FIG. 7 is a perspective view depicting the scanning of a container's annular barcode indicia at a register;

FIG. 8c is a rotated isometric view of FIG. 8a;

FIG. 9b is bottom elevational view of the base of FIG. 9a;

FIG. 11a is a front elevational view of a container with a wavy or sinusoidal barcode indicia;

FIG. 11b is a rotated isometric view of FIG. 11a;

FIG. 12a is a front elevational view of a container with a portion of barcode indicia that spiral up the container and are joined to and/or intersect with a portion of barcode indicia that wrap substantially horizontally around the container;

FIG. 12b is a rotated isometric view of FIG. 12a;

DESCRIPTION OF THE PREFERRED EMBODIMENTS

Figure 1A:
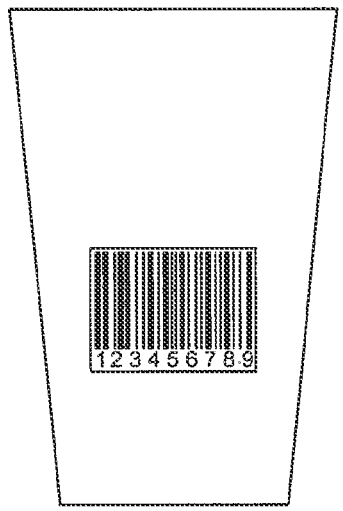
FIG. 1a is an elevational view of a prior art container having a traditional barcode with barcode indicia extending a short distance vertically on the outside of the container.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Some embodiments of the present invention include a system and method that use annular bar code indicia extending around the exterior surface of a cup or container to identify the type and quantity of beverage associated with that container. In a preferred embodiment, the bar code indicia can contain information related to the type of beverage to be dispensed into the container, the amount of beverage to be dispensed into the container, the cost of the beverage in the container, or any one or more of these parameters in combination, for example. Accordingly, the present invention can provide a system and method for automatically recognizing the type and quantity of beverage to be dispensed and confirming to customers and store personnel that the beverage being purchased is in fact the same beverage that was dispensed into the container.

A scanner or reader incorporated in an associated beverage dispensing machine is provided to read the indicia on the container and use the information contained therein to dispense the appropriate amount of a particular beverage. At checkout, a store clerk or cashier can use a separate machine to scan the indicia on the container and automatically generate and input the price of the beverage into a cash register or other device used to complete a purchase.

Because the barcode indicia in embodiments of the present invention are annular and can extend around the exterior surface of a container, the associated scanner in the dispensing machine can read the indicia regardless of the container and indicia's rotational orientation relative to the scanner. That is, as long as the container is oriented with the open end upwards, the rotation of the container and indicia relative to the scanner is irrelevant to the scanner's ability to detect and read the indicia.

Since the associated scanner can read the indicia regardless of the rotation of the cup when the cup is inserted into the dispensing machine, a customer can be provided with a beverage, as explained in detail below, without having to experiment with the cup or machine, read detailed instructions, or seek assistance from store personnel. This can reduce frustration that some customers encounter when trying to align the indicia with the scanner to activate the beverage dispensing machine. Because the indicia cannot be misaligned with the scanner as long as the open end of the container is oriented upwards, the likelihood that a container will be misaligned with a scanner is reduced if not completely eliminated.

A beverage dispensing machine in accordance with embodiments of the present invention can include software, control circuitry, and a programmable processor to operate the dispensing machine and scanner and to cause the machine to lock and unlock as explained below. In this way, if a scanner associated with the machine detects acceptable barcode indicia, the control circuitry, associated with the machine can unlock the machine and cause the machine to dispense the appropriate amount and type of beverage. Conversely, if the scanner detects unacceptable barcode indicia or no indicia at all, control circuitry can cause the machine to lock and not dispense any beverage.

In association with the scanner, software, control circuitry, and programmable processor of the present invention, barcode indicia containing information on quantity and type of beverage can prevent a consumer from using a container that is not intended for a particular type or quantity of beverage by not distributing an incorrect beverage in response to particular indicia. Furthermore, systems and methods of the present invention can prevent customers of a store from attempting to pass off one beverage for another and thereby misinforming store personnel of the type and quantity of beverage dispensed. The method and system can also prevent unauthorized or partial refills of beverages by not dispensing beverages in response to previously used or inappropriate barcode. Barcode indicia containing information on pricing associated with a particular type and quantity of a beverage can eliminate or reduce errors made by store personnel in entering the price for particular a particular beverage.

Systems and methods in accordance with the present invention can provide stores with an improved method for tracking inventory of particular beverages or tracking consumer or seasonal trends that may be tied to particular beverages. For example, software associated with the beverage dispensing machine can track the amount and type of beverages sold so that accurate statistics can be generated on a daily, weekly, or monthly basis, for example. When barcode indicia is scanned at either the dispensing machine or the register, the amount and type of beverage dispensed or being purchased could be entered into a tracking database. Generated statistics can be used by store personnel or owners to determine types and quantities in stock and to be ordered or to determine worthwhile promotions that are likely to enhance sales.

Figure 1B:
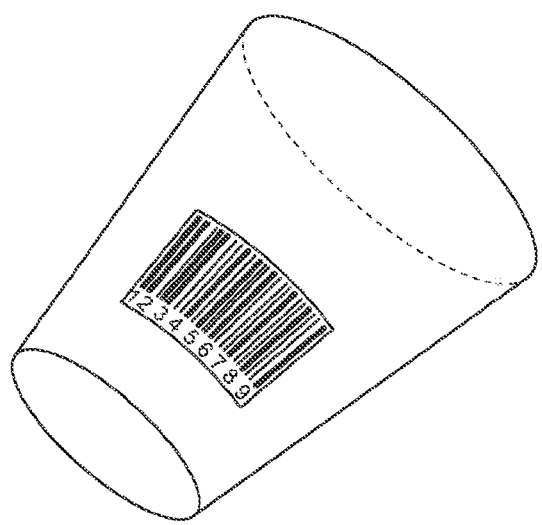
Figure 1C:
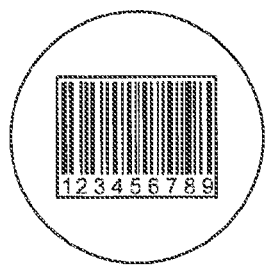
FIG. 1c is a bottom elevational view of a base of a prior art container having traditional barcode indicia.

Referring now to FIG. 1, an exemplary beverage identification system 10 made in accordance with the teachings of the present invention is shown. The system 10 can include a beverage dispensing machine 16, a dispenser 24, and a scanner 18. A cup or container 14 can be used in connection with the machine 16 to collect the liquid dispensed from the dispenser 24, and the container 14 can include annular barcode indicia 12 on the exterior thereof. It is to be understood that the machine 16, dispenser 24, and scanner 18 shown in FIG. 1 are merely exemplary and a variety of beverage dispensing machines, dispensers, containers, and scanning mechanisms as known by those of skill in the art can be used in connection with the present beverage identification system.

The scanner 18 can be located adjacent to the dispensing area 20 of the machine 16, and containers 14 can be positioned in the dispensing area 20 so as to be filled with liquid from the dispenser 24. The scanner 18 can be orthogonally oriented relative to the dispensing area 20 so that when a container 14 is placed in the dispensing area 20, the scanner 18 projects a generally horizontal beam 22 towards the barcode indicia 12 on the container 14. In this manner, the scanner 18 can read the barcode indicia 12 causing elements of the system to decipher the information associated therewith.

As shown in FIG. 1, the barcode indicia 12, in embodiments of the present invention, can be annular and situated on an exterior surface of the container 12. The barcode indicia 12 could be printed on the exterior of the container 12 or removably or fixedly attached thereto using a label or a sleeve, for example.

The annular barcode indicia 12 can be centered around a generally vertical axis of the container. The arrangement of the barcode indicia 12 can allow the scanner 18 to read the indicia 12 irrespective of the of the container's rotational orientation 14 relative to the scanner 18. That is, the barcode indicia 12 can be read regardless of the rotation of the container 14 when it is placed in the dispensing area 20 as long as the container is placed with its open end facing upwards.

Figure 3:
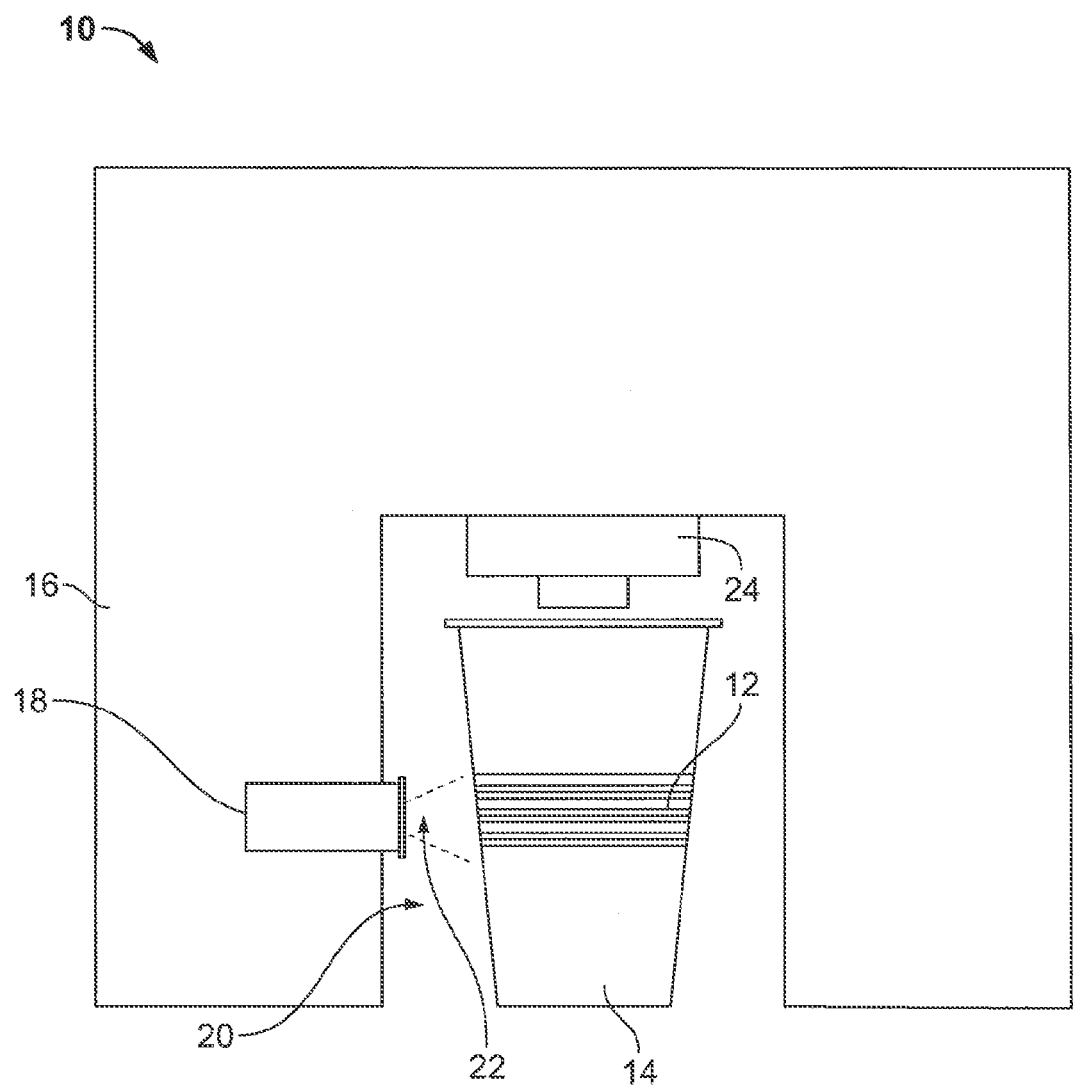
FIG. 3 is an elevational view of a beverage dispensing machine and associated container made in accordance with one embodiment of the present invention.
Figure 5A:
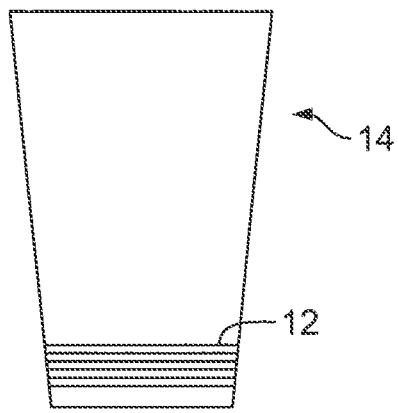
FIG. 5A is an elevational view of a container with annular barcode indicia on a bottom portion thereof in accordance with one embodiment of the present invention.
Figure 5B:
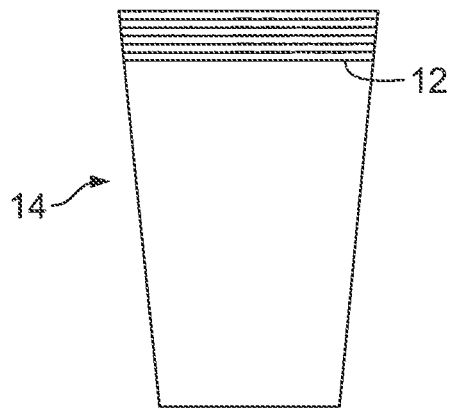
FIG. 5B is an elevational view of a container with annular barcode indicia on a top portion thereof in accordance with one embodiment of the present invention.
Figure 5C:
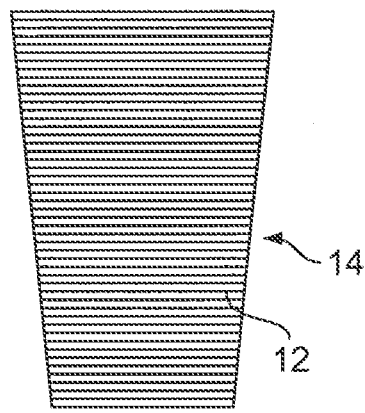
FIG. 5C is an elevational view of a container with annular barcode indicia along the entire vertical length of the container in accordance with one embodiment of the present invention.
Figure 5D:
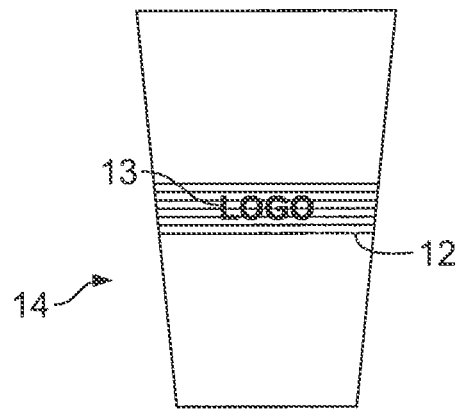
FIG. 5D is an elevational view of a container with annular barcode indicia on a middle portion thereof and a logo incorporated in the indicia in accordance with one embodiment of the present invention.
Figure 6:
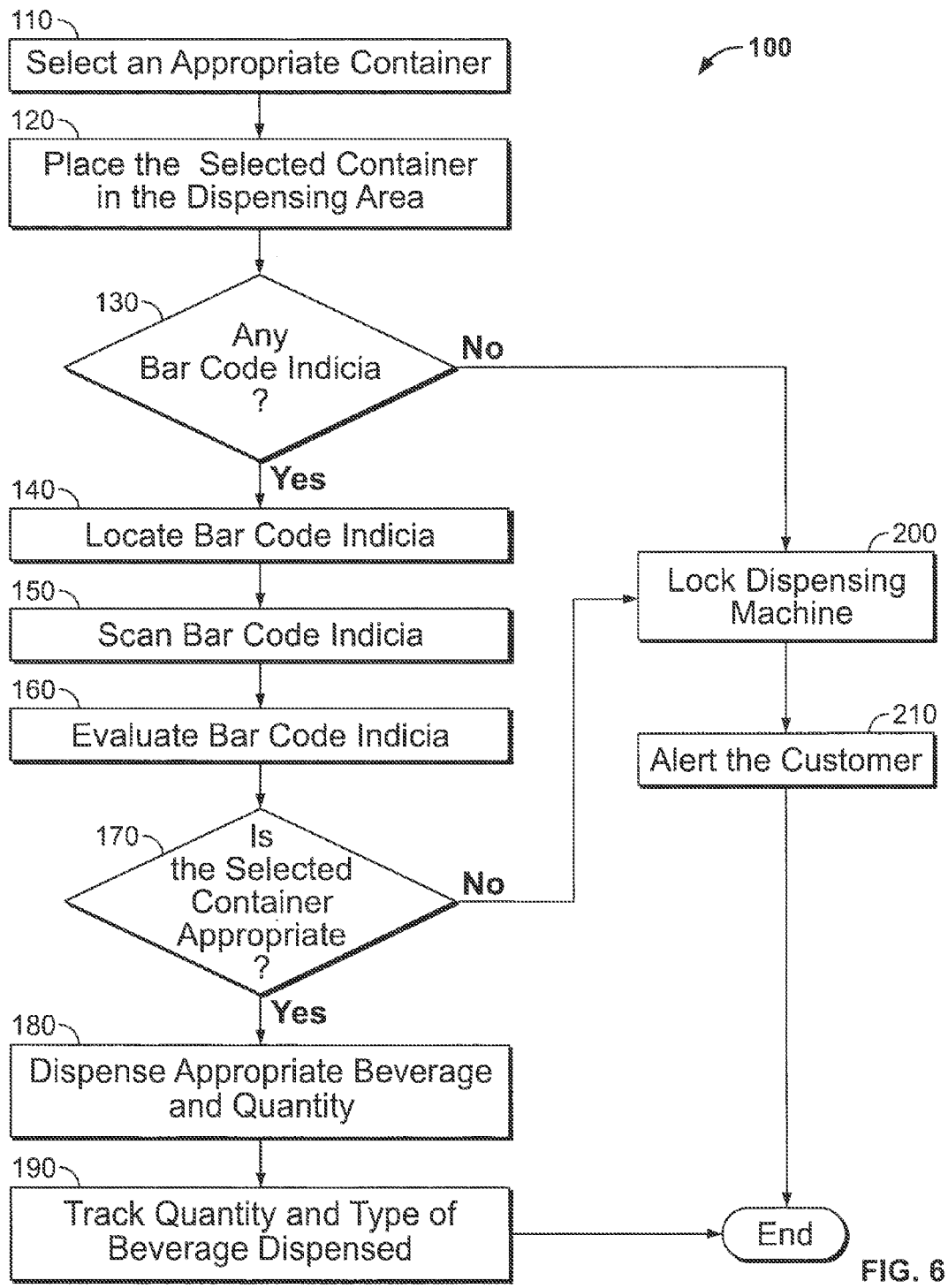
FIG. 6 is a flow diagram of a method of dispensing a beverage in accordance with one embodiment of the present invention.
Figure 8A:
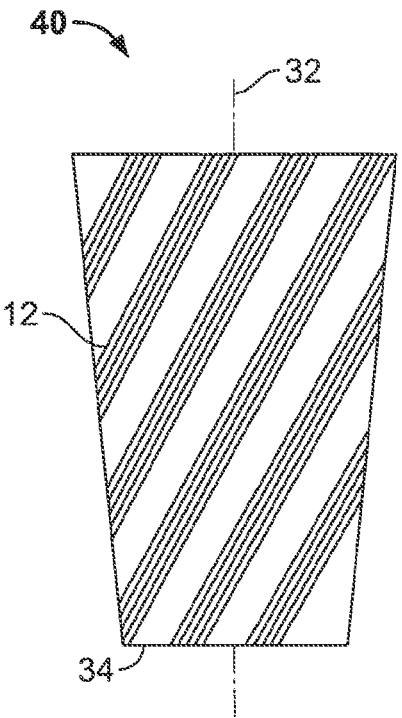
FIG. 8a is a front elevational view of a container with spiraling barcode indicia in accordance with one embodiment of the present invention.
Figure 8B:
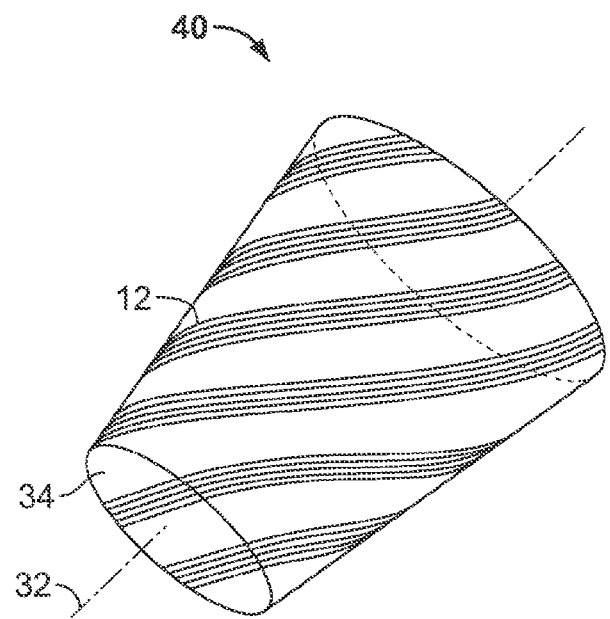
FIG. 8b is a rotated isometric view of FIG. 8a, wherein the barcode indicia extending onto the base of the container are straight.
Figure 8C:
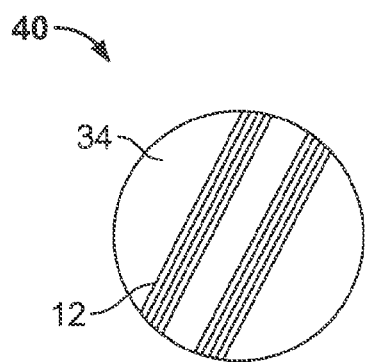
Figure 9A:
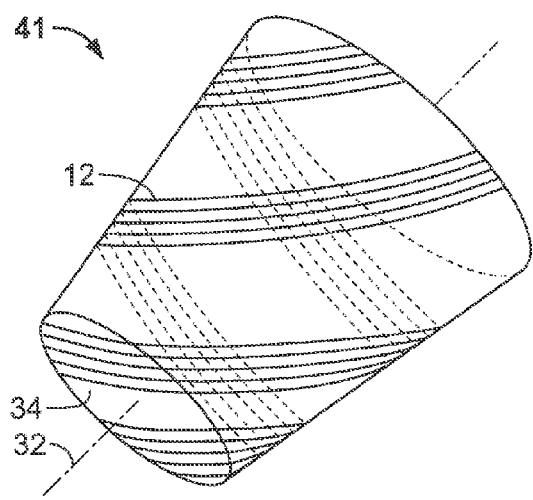
FIG. 9a is an alternative rotated isometric view of FIG. 8a, where the barcode indicia extending onto the base of the container are curved.
Figure 9B:
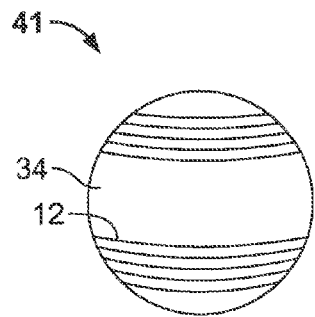
Figure 10:
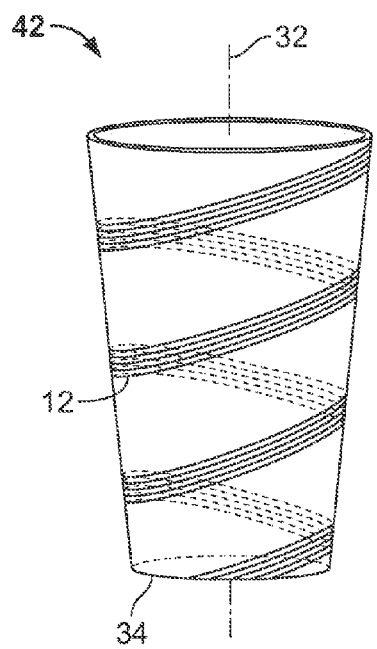
FIG. 10 is an isometric view of a container with one continuous set of spiraling barcode indicia.

It is to be understood that the barcode indicia 12 shown in FIG. 1 is merely exemplary and the indicia can be located at any height along the vertical axis of the container 14. As seen in FIG. 1, the indicia 12 are circumferentially placed around the middle portion of the container 14. However, the annular indicia 12 can be located around a bottom portion of the container 14 as seen in FIG. 3A or around a top portion of the container 14 as seen in FIG. 3B or any combination thereof. Similarly, the scanner 18 can be located at a variety of different positions and can have a variety of different dimensions to allow for reading the indicia on containers placed in the dispensing area. The size and placement of the scanner 18 as shown in FIG. 1 are merely exemplary.

In embodiments of the present invention, the annular barcode indicia 12 can be located on substantially the entire vertical length of the container 14: from the top end to the bottom end thereof as seen in FIG. 3C. Similarly, the scanner 18 can have an effective reading width such that the scannable area extends the entire length of the wall in the dispensing area 20.

In other embodiments, a scanner 18 can search for the annular indicia 12 by traversing up and down on an axis generally perpendicular to the central vertical axis of the container. In this embodiment, the scanner 18 can search and find the indicia 12 no matter where along the height of the container 14 the indicia 12 are placed.

In still further embodiments, containers 14 containing barcode indicia 12 can also have wording, markings, or logos thereon or applied thereto. The wording, markings, or logos could be on areas of the container with no barcode indicia or, wording, markings, or logos could be incorporated into the barcode indicia as seen in FIG. 3D. Incorporating a logo into or onto barcode indicia can make the container aesthetically pleasing to customers while still making the indicia functional to the store and the dispensing machine.

The barcode indicia 12 can represent or be encoded with information related to the container on which the indicia are printed as well as the beverage to be dispensed therein. The indicia can represent information or data about the size of the associated container, the type and nature of beverages that are appropriate for dispensing in the associated container, the appropriate amount of liquid that can be dispensed in the associated container, pricing information for beverages that can be dispensed in the associated container, and the like all without limitation. For example, a 16-ounce coffee cup can have different indicia than a 20-ounce cup of cola, which can have different indicia than a 36-ounce frozen beverage. It is to be understood that the types of information or data represented by or embedded in the barcode indicia are not limitations of the present invention.

Additionally, the indicia can provide a safety check for consumers. For example, certain containers might only be suitable for cold beverages because the container might be incapable of retaining its physical integrity in the presence of a very hot beverage. This coded information concerning the type of appropriate beverage or capacity of the container can be included in the barcode indicia on the container and, when read by the scanner, prevent the dispensing of a hot beverage into a container designated only for cold beverages. Accordingly, the likelihood of the accidental scalding of a customer can be reduced if not eliminated.

Figure 2A:
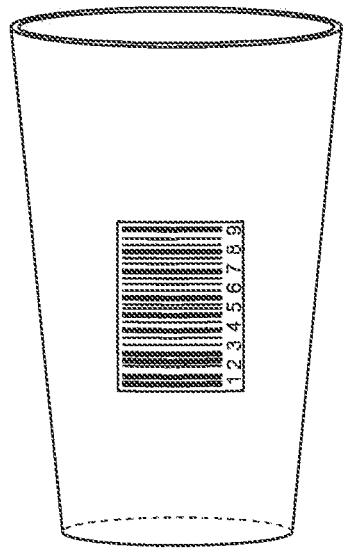
FIG. 2a is an isometric view of a prior art container with barcode indicia extending a short way around the container.
Figure 2B:
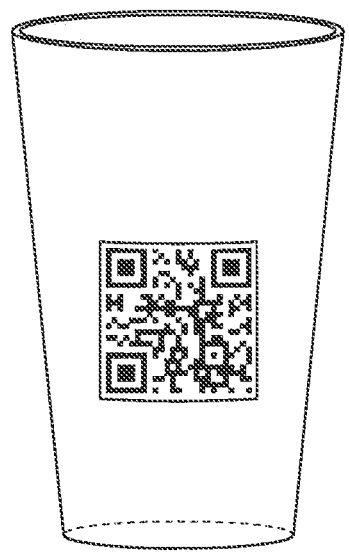
FIG. 2b is an isometric view of a prior art container with a QR barcode.

Referring now to FIG. 2, an exemplary block diagram of the beverage dispensing machine 16 is shown. As seen in FIG. 16, the machine 16 can include a programmable processor 26, software 28, and associated control circuitry 30. In methods of using the beverage identification system 10 of FIG. 1, a user can place a container 14 with the annular barcode indicia 12 in the dispensing area 20, and the scanner 18 can read the indicia 12. The scanner 18 can send the read indicia 12 to the control circuitry 30. Using the software 28, the programmable processor 26 can evaluate the indicia 12 and direct the control circuitry 30 to dispense only the appropriate type and amount of liquid that corresponds to the barcode indicia 12.

The programmable processor 26 can lock the machine 16 to prevent it from dispensing any liquid if a cup 12 without barcode indicia is determined to be in the dispensing area 20 or if an improper cup 12 is being used in connection with the machine 16. In embodiments of the present invention, the programmable processor can send commands to the control circuitry 30 to visually or audibly alert a consumer of any errors or irregularities. Appropriate alerting devices are known to those having ordinary skill in the art.

A method 100 of dispensing a beverage in accordance with one embodiment of the present invention is shown in FIG. 4. A user can select an appropriate container in 110 such that the selected container should be appropriate for being filled with a desired type and quantity of beverage. The user can place the selected container in the dispensing area in 120, and then the programmable processor, in association with the scanner, can determine if there are any barcode indicia on the container in 130. If there are barcode indicia, the scanner can locate the indicia in 140, scan the indicia in 150 and the programmable processor, in association with the control circuitry and software, can evaluate the scanned indicia in 160. If the container is deemed appropriate in 170, the control circuitry, in association with the programmable processor and software, can cause a proper amount of the appropriate beverage to be dispensed into the container in 180, and the type and quantity of beverage dispensed can be tracked in 190.

However, the container could be determined inappropriate if, for example, the container is not designated for receiving a particular type of beverage. If the container is deemed inappropriate in 170, the control circuitry could lock the machine in 200 and notify the user that an improper cup is being used and/or direct the user to an appropriate cup in 210.

Appropriate cups or containers for particular beverages or for particular machines could be designated by color, location, size or the like, for example, all without limitation. Accordingly, a store could have one type of container designated for higher priced products and another type of container designated for lower priced products, for example. In embodiments of the present invention, a beverage will only be dispensed by placing an appropriately marked container in the dispensing area of the machine; placing any other container in the dispensing area will result in no beverage being dispensed to the inappropriate container.

Referring now to FIG. 7, once the container 14 has been appropriately filled by a beverage dispensing machine, a user can take the filled container 14 to a cash register 300 for checkout. The barcode indicia 12 can be scanned by a scanner 318 at the register to generate the price corresponding to the beverage in the container 14. Additionally, the amount and type of beverage dispensed or being purchased could be entered into a tracking database.

Referring now to FIGS. 8a-10, alternative containers 40, 41, and 42 are shown with barcode indicia 12 that spiral up and around a longitudinal or vertical axis 32 of the container in a conical helix pattern. The conical helix pattern may be formed by several sets of spiraling barcode indicia 12, as depicted for example in FIGS. 8a-9a, or may be formed by one continuous set of spiraling barcode indicia 12, as depicted for example in FIG. 10. In either case the conical helix of barcode indicia is centered around a generally vertical axis 32 of the container. Further, the arrangement of the barcode indicia 12 is such that the scanner 18 or 318 can read the indicia 12 regardless of the container's rotational orientation 14 relative to the scanner 18 or 318.

Additionally, as seen in FIGS. 8b-9b, barcode indicia 12 may optionally also extend onto the base 34 of the containers 40-42. The barcode indicia 12 on the base of the containers 40-42 may be substantially linear (i.e., as in FIGS. 8b and 8c) or may be substantially curved (i.e., as in FIGS. 9a and 9b). The barcode indicia 12 on the base of the containers 40-42 may also be read by the scanner 18 or 318 as an alternative to or in addition to reading the barcode indicia 12 on the wall of the container. Although typical self service beverage dispensers may have grates and/or liquid collecting drains below the dispensing area 20 that prevent the scanner 18 from being disposed directly below the container 40-42 when the container is in the dispensing area 20, the scanner 18 may be positioned on the periphery of the grate and/or liquid collecting drain and positioned at an angle that would still allow the scanner 18 to read barcode indicia 12 on the base of the container when in the dispensing area 20.

Referring now to FIGS. 11a and 11b, an alternative container 43 is shown with barcode indicia 12 that wrap or extend circumferentially about and around the longitudinal or vertical axis 32 in a substantially sinusoidal wave like pattern. The sinusoidal wave like pattern is centered on a generally vertical axis 32 of the container. The arrangement of the barcode indicia 12 repeats uniformly such that the scanner 18 or 318 can read the indicia 12 regardless of the of the container's rotational orientation 14 relative to the scanner 18 or 318.

Referring now to FIGS. 12a and 12b, another alternative container 44 is shown. The container 44 is similar to the containers shown in FIGS. 8a-10 in that at least one portion 36 of barcode indicia 12 spiral and/or extend up and about the longitudinal axis 32 of the container 44 in a conical helix pattern centered around the vertical axis 32 of the container.

Figure 12C:
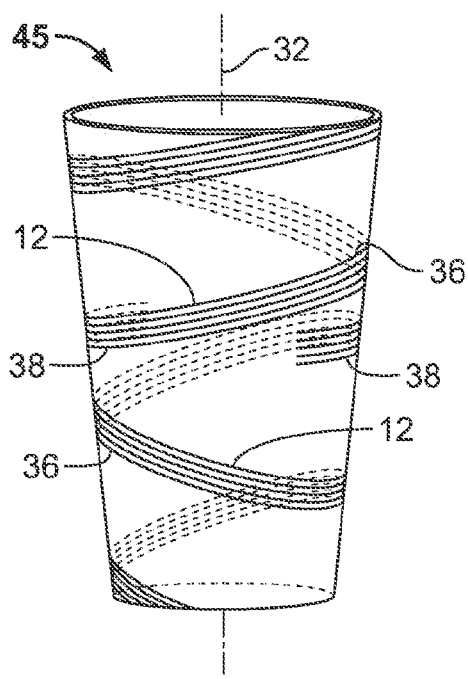
FIG. 12c is an isometric view of a container with a portion of barcode indicia that spiral up the container and a portion of barcode indicia that spiral down the container, with both portions joining and/or intersecting portions of barcode indicia that wrap substantially horizontally around the container.
Figure 12D:
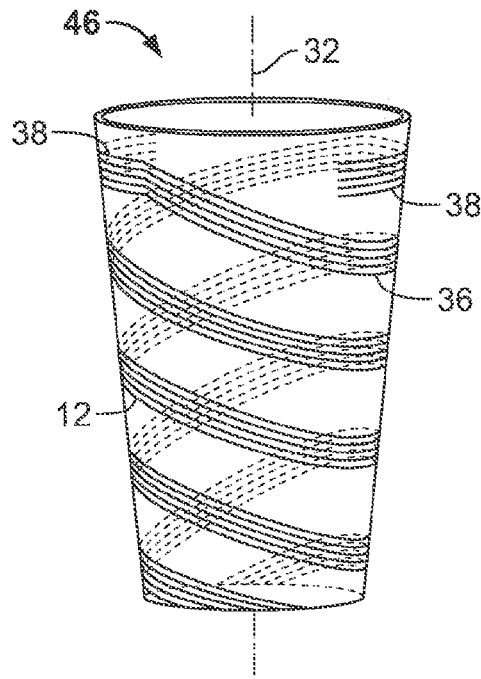
FIG. 12d is an isometric view of a container with a portion of barcode indicia that spiral down the container joined to and/or intersected with a portion of barcode indicia that wrap substantially horizontally around the container.

Additionally, a second portion 38 of barcode indicia 12 wrap and/or extend circumferentially about the container centered around the vertical axis 32 of the container and perpendicular to at least one of the two dimensional planes that would include the longitudinal axis 32 of the container 44, similar to the container 14 shown in FIGS. 5*a*-5*d*. As shown in FIGS. 12*a* and 12*b*, the first and second portions may be joined to one another and/or intersect near the base of the container 44. Alternatively, the first and second portions 36, 38 may be joined and/or intersect near the top of the container 46, as depicted for example in FIG. 12*d*. From the top of the container 45 the first portion 36 of barcode indicia 12 spiral and/or extend down and about the longitudinal axis 32 of the container 45 in a conical helix pattern centered on the longitudinal axis 32. In a further alternative embodiment, the first and second portions may be joined and/or intersect near the middle of the container 45. From the middle of the container the first portions 36 of barcode indicia 12 spiral and/or extend both up and down the container 45 in a conical helix pattern centered around the longitudinal axis 32, as depicted for example in FIG. 12*c*. In a still further alternative embodiment, the first and second portions may be entirely separate and never join, intersect, and/or connect. As depicted in FIGS. 12*a*-12*d*, there may be two or more sets of barcode indicia 12, each set having two portions. Alternative embodiments may have only one continuous set of barcode indicia, similar to FIG. 10, or may have three or more sets of barcode indicia. The barcode indicia 12 on the alternative container 45 ensure that the scanner 18 or 318 can read at least one or both of the first portion 36 and the second portion 38 of the barcode indicia 12 regardless of the rotational orientation of the container 45 relative to the scanner 18 or 318.

It should be noted that the present invention may be used in conjunction with an open or closed container of any shape. For example, referring now to FIGS. 13-17*b* alternative containers 50-57 are shown that have rectangular rather than annular walls. Each container 50-57 has a rectangular base 60 that is connected to a front and rear face 62 and two sidewalls 64. The front and rear faces 62 depicted in the figures are identical and indistinguishable to one another, as are the sidewalls 64, though in practice this may not be the case. Each face 62 and each sidewall 64 extends upwardly from the base 60 parallel to the longitudinal axis 32 of the containers 50-57. The top of the containers 50-57 may be open or may have a flap, flange, lid, cap, and/or some other device (not shown) for closing and securing the containers 50-57.

Figure 13:
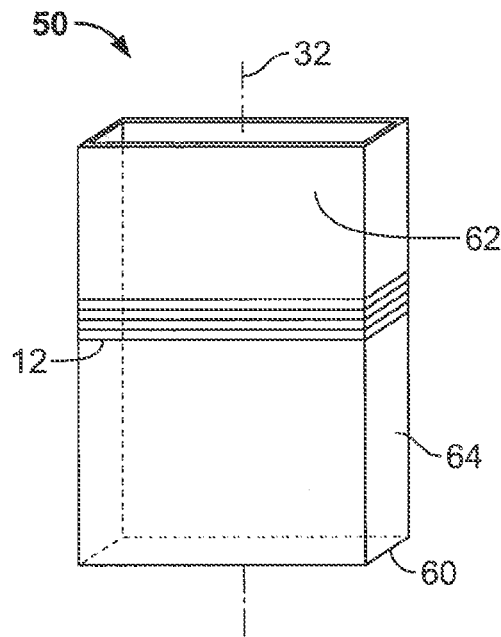
FIG. 13 is an isometric view of a rectangular container having barcode indicia wrapping substantially horizontally around a middle portion of the container.
Figure 14:
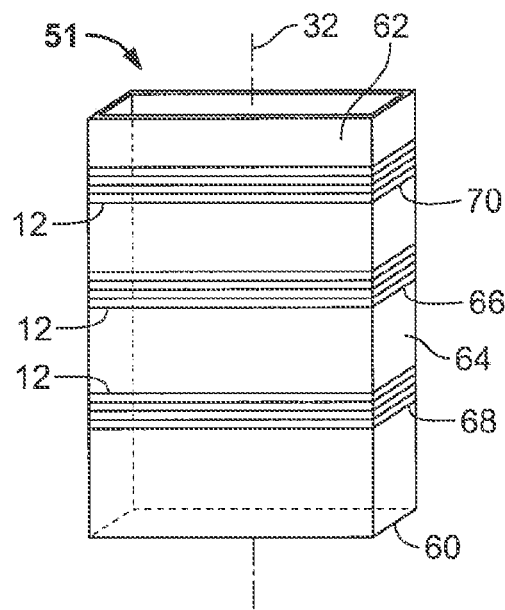
FIG. 14 is an isometric view of a rectangular container having three sets of barcode indicia wrapping substantially horizontally around an upper, middle, and lower portion of the container.

Barcode indicia 12 may be disposed on an exterior surface of the faces 62 and side walls 64 of the rectangular containers in much the same manner as described above with respect to annular containers. That is, barcode indicia 12 may wrap and/or extend circumferentially around the lateral circumference of the exterior surface of the containers 50 and 51 encompassed by both faces 62 and both sidewalls 64, as shown in FIGS. 13 and 14. The barcode indicia 12 on the exterior surface of the containers 50 and 51 are generally centered around the longitudinal axis 32 of the containers 50 and 51 and are perpendicular to at least one of the set of planes that would include the longitudinal axis 32 of the containers 50 and 51. FIG. 13 depicts an embodiment wherein the barcode indicia 12 wrap and/or extend circumferentially around the middle of the container 50. FIG. 14 shows an embodiment wherein a first set 66 of barcode indicia 12 wrap and/or extend circumferentially around the middle of the container 51 while a second set 68 of barcode indicia 12 wrap and/or extend circumferentially around a lower portion of the container 51 and a third set 70 of barcode indicia 12 wrap and/or extend circumferentially around an upper portion of the container 51.

In other embodiments (not shown) the barcode indicia 12 may be located on substantially the entire vertical length of the container from the top end to the bottom end thereof Similarly, the scanner 18 or 318 may have an effective reading width such that the scannable area extends the entire vertical length of the wall.

Figure 15A:
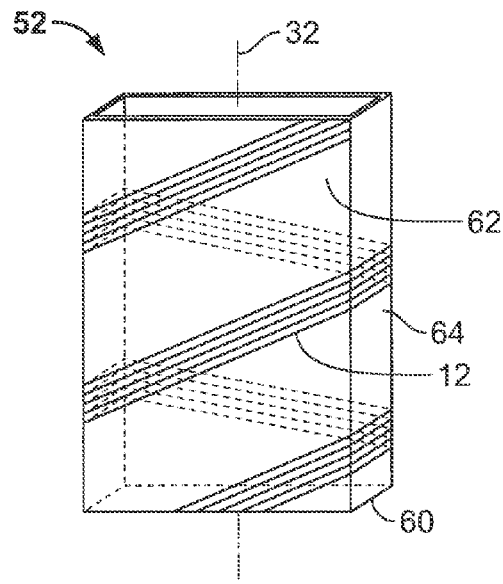
FIG. 15a is a rectangular container with one continuous set of spiraling barcode indicia forming a rectangular helix pattern.
Figure 15B:
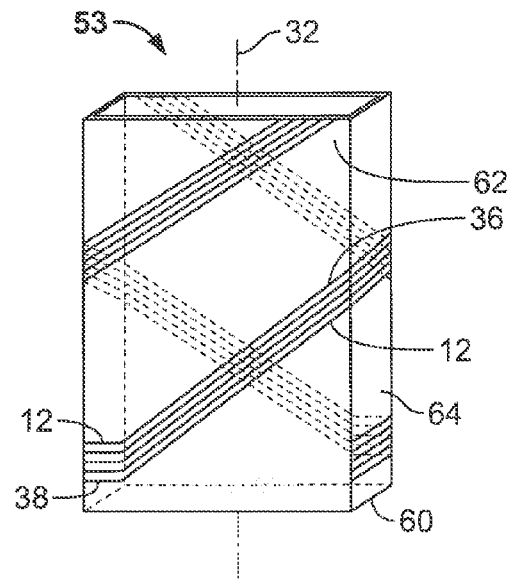
FIG. 15b is an isometric view of a rectangular container having a portion of barcode indicia that spiral up the container and a portion of barcode indicia that wrap substantially horizontally around the container.
Figure 15C:
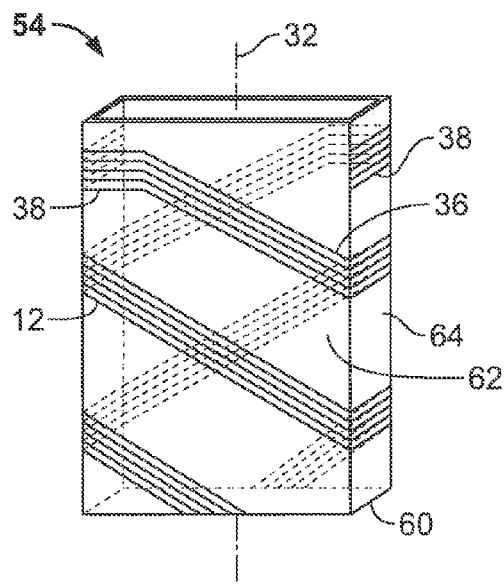
FIG. 15c is an isometric view of a rectangular container with a portion of barcode indicia that spiral down the container joined to and/or intersected with a portion of barcode indicia that wrap substantially horizontally around the container.
Figure 15D:
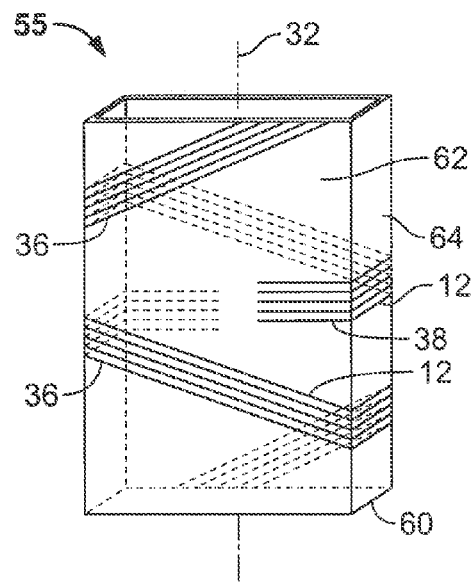
FIG. 15d is an isometric view of a rectangular container with a portion of barcode indicia that spiral up the container and a portion of barcode indicia that spiral down the container, with both portions joining and/or intersecting portions of barcode indicia that wrap substantially horizontally around the container.

In alternative embodiments, barcode indicia 12 may spiral and/or extend up and around the longitudinal axis 32 of at least a portion of containers 52-55 in a rectangular helix pattern centered around the longitudinal axis 32, as shown for example in FIGS. 15*a*-15*d*. In FIG. 15*a*, the barcode indicia 12 spiral and/or extend from the bottom of the container 52 all the way to the top of the container 52 in one continuous rectangular helix pattern centered on the longitudinal or vertical axis 32. In FIGS. 15*b*-15*d*, a first portion 36 of the barcode indicia 12 spiral and/or extend up and around the longitudinal axis 32 of at least a portion of containers 53-55 in a rectangular helix pattern centered around the longitudinal axis 32. Additionally, a second portion 38 of barcode indicia 12 may wrap or extend at least part of the way around the circumference of the containers 53-55, centered on the longitudinal axis 32 and perpendicular to at least one of the set of planes that would include the longitudinal axis 32 of the containers 53-55, similar to FIGS. 12*a*-12*d* described above. As also shown in FIGS. 15*a*-15*c*, the first and second portions 36, 38 may be joined to one another and/or intersect. The first and second portions may be joined, connect, and/or intersect near the bottom of the container 53, as depicted for example in 15*b*. From the bottom, the first portion 36 of the barcode indicia 38 may spiral and/or extend up and around the longitudinal axis 32 of at least a portion of the container 53 in a rectangular helix pattern centered on the longitudinal axis 32. Alternatively, the first and second portions may be joined, connect, and/or intersect near the top of the container 54, as depicted for example in 15*c*. From the top, the first portion 36 of the barcode indicia 12 may spiral and/or extend down and around the longitudinal axis 32 of at least a portion of the container 54 in a rectangular helix pattern centered on the longitudinal axis 32. In a still further alternative embodiment, the first and second portions 36, 38 may be joined, connect, and/or intersect near the middle of the container 55, as depicted for example in FIG. 15*d*. From the middle of the container 55, the first portions 36 of barcode indicia 12 may spiral upwards or downwards, or both upwards and downwards. In a further alternative embodiment, the first and second portions may remain entirely separate. In any case, the arrangement of the barcode indicia 12 is such that the scanner 18 or 318 can read one or both portions 36, 38 of the indicia 12 regardless of the rotational orientation of the container relative to the scanner 18 or 318.

Figure 16A:
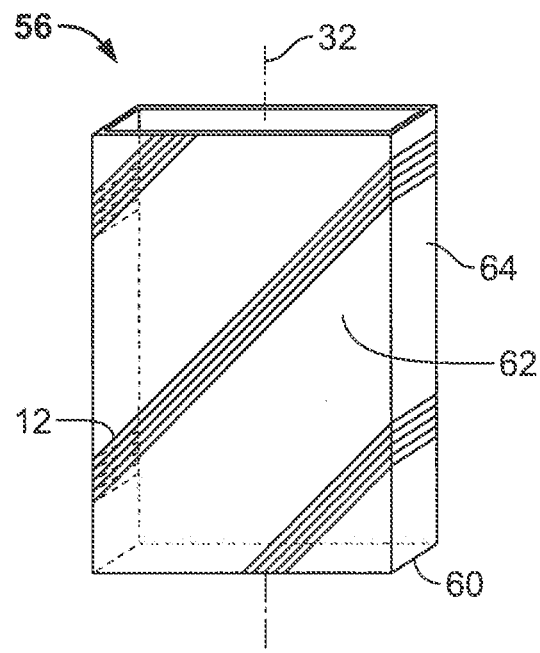
FIG. 16a is an isometric view of a rectangular container having spiraling barcode indicia optionally extending onto the base of the container.
Figure 17A:
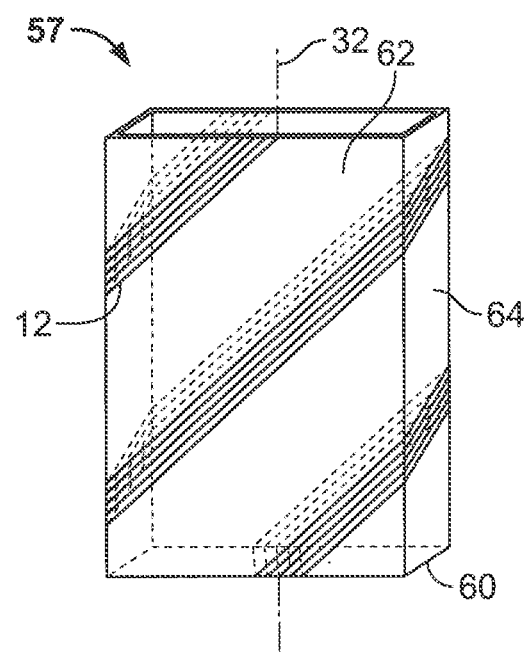
FIG. 17a is an isometric view of an alternative rectangular container having spiraling barcode indicia extending onto the base of the container.

FIGS. 16*a* and 17*a* depict containers 56 and 57 where at least a portion of the barcode indicia 12 wrap or extend around the lateral circumference of the container 55, 57 encompassed by both faces 62 and both sidewalls 62. However, unlike FIGS. 13 and 14, the barcode indicia 12 does not always extend perpendicular to at least one of the set of planes that would include the longitudinal or vertical axis 32 of the containers 56, 57, though the barcode indicia 12 is generally centered around the longitudinal or vertical axis 32. In FIG. 16*a*, the barcode indicia 12 on the sidewalls 64 extend perpendicular to at least one of the set of planes that would include the longitudinal or vertical axis 32 of the container 56, while the barcode indicia 12 on the face 62 of the container 56 do not. In contrast, FIG. 17*a* depicts an embodiment in which the barcode indicia 12 do not extend perpendicular to at least one of the set of planes that would include the longitudinal or vertical axis 32 of the container 57, regardless of whether the barcode indicia 12 is on the sidewalls 64 or on the faces 62 of the container 57.

Figure 16B:
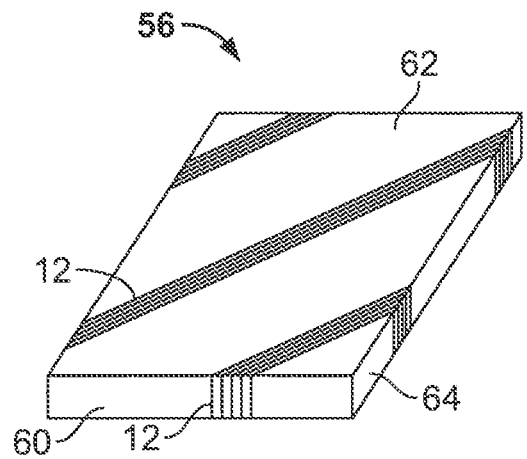
FIG. 16b is an isometric view of the base of the rectangular container of FIG. 15a, depicting substantially linear bar code indicia on the base extending substantially perpendicular to the faces of the container.
Figure 17B:
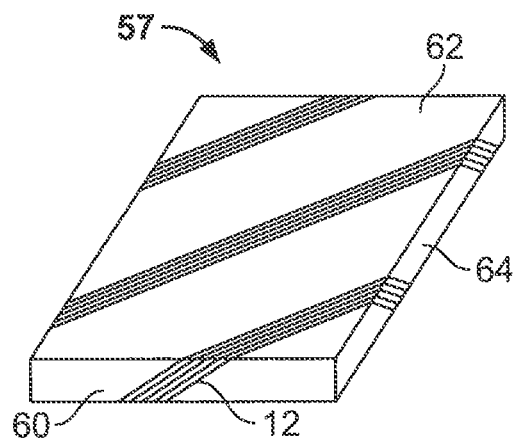
FIG. 17b is an isometric view of the base of the rectangular container of FIG. 16a, depicting substantially linear bar code indicia on the base of the container extending non-perpendicularly to the faces of the container.

As seen in FIGS. 16*b* and 17*b*, barcode indicia 12 may also extend onto the base 60 of the containers 56 and 57. The barcode indicia 12 on the base 60 of the containers 56 and 57 may be straight and perpendicular to the faces 62 of the container 56, as in FIG. 16*b*, or slanted such that it the barcode indicia 12 are not perpendicular to the faces 62 of the container 57, as in FIG. 17*b*. The barcode indicia may also be curved, as depicted for instance in FIG. 9*b*. The containers 52-55 may similarly include barcode indicia 12 on the base 60. In any case, the barcode indicia 12 on the base of any container may be read by the scanner 18 or 318 as an alternative to or in addition to reading the barcode indicia 12 on the sidewalls 64 and/or faces 62 of the containers.

It should be understood that in all of the above embodiments the barcode indicia 12 can also have wording, markings, or logos thereon or applied thereto. The wording, markings, or logos could be on areas of the container with no barcode indicia 12 or, wording, markings, or logos could be incorporated into the barcode indicia 12. The barcode indicia 12 can also represent or be encoded with information related to the container on which the indicia are printed as well as the beverage to be dispensed therein. The indicia 12 can represent information or data about the size of the associated container, the type and nature of beverages that are appropriate for dispensing in the associated container, the appropriate amount of liquid that can be dispensed in the associated container, pricing information for beverages that can be dispensed in the associated container, and the like all without limitation. Additionally, the indicia 12 can provide a safety check for consumers. This coded information concerning the type of appropriate beverage or capacity of the container can be included in the barcode indicia 12 on the container and, when read by the scanners 18, may prevent the dispensing of a hot beverage into a container designated only for cold beverages. Accordingly, the likelihood of the accidental scalding of a customer can be reduced if not eliminated. Also, the bar code indicia 12 alone or in combination with other designs, graphics, wording, line art, etc. may comprise a decorative element for the container if desired. Further, the barcode indicia may be of differing thickness, width, shade, and/or color in order to encode the aforementioned information.

Systems and methods in accordance with the present invention can be used in connection with all different types of beverages, including beverages that are sold in the same size of container but at different price points. For example, a beverage dispensing machine in accordance with the present invention can dispense barista-style coffees and latter or more functional beverages with added vitamins, fiber, omega-3, or other ingredients that have traditionally been difficult to manage in known self-service arrangements.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed is:

1. A container, comprising:
a base, an annular wall, and a longitudinal axis, wherein the base and annular wall are configured to hold a liquid; and
barcode indicia disposed on an exterior surface of the annular wall,
wherein at least a portion of the barcode indicia spiral up and around the longitudinal axis of at least a portion of the exterior surface of the annular wall in a conical helix pattern, and
wherein the barcode indicia contains information regarding the type and amount of liquid for which the container is to be used.

2. The container of claim 1, wherein at least a portion of the barcode indicia extend circumferentially about the longitudinal axis of the exterior surface of the annular wall.

3. The container of claim 1, wherein at least a portion of the barcode indicia wrap at least part of the way around the exterior surface of the annular wall perpendicular to the longitudinal axis.

4. The container of claim 1, wherein at least a portion of the barcode indicia extend from the exterior surface of the annular wall onto the base.

5. The container of claim 3, wherein the portion of the barcode indicia that extend circumferentially about the exterior surface of the annular wall perpendicular to the longitudinal axis and the portion of the barcode indicia that spiral up and around the longitudinal axis of at least a portion of the exterior surface of the annular wall in a conical helix pattern are connected.

6. The container of claim 1, wherein at least a portion of the barcode indicia are parallel along the longitudinal axis of the annular wall, such that a first portion of barcode indicia extend parallel to a second portion of barcode indicia that are above or below the first portion on the exterior surface of the annular wall.

7. The container of claim 1, where in the barcode indicia contain information related to at least one of container size, appropriate container contents, or pricing information.

8. A method for using a container, comprising the steps of:
placing the container in a scanning area of a machine, the container having a longitudinal axis, an exterior surface, and barcode indicia disposed on the exterior surface, wherein at least a portion of the barcode indicia spiral up and around the longitudinal axis of at least a portion of the exterior surface of the container;
having the barcode indicia scanned and evaluated by the machine, the barcode indicia being scanned regardless of the rotational orientation of the container; and
evaluating the scanned barcode indicia,
wherein the scanned barcode indicia is evaluated to determine whether the container is appropriate for holding a particular type and amount of liquid.

9. The method for using a container described in claim 8, wherein the scanned barcode indicia is evaluated to determine whether the container is appropriate for use with the machine based on an information encoded in the scanned barcode indicia.

10. The method for using a container described in claim 8, further comprising the step of generating a price corresponding to the contents of the container based on the information encoded in the scanned barcode indicia.

11. The method for using a container described in claim 8, wherein the barcode indicia extend onto a bottom closed end of the container.

12. A container, comprising:
a receptacle defined by a base, a longitudinal axis, a front face extending upwards from the base, a rear face extending upwards from the base, and a plurality of side walls extending upwards from the base parallel to the longitudinal axis, wherein the receptacle is configured to hold a liquid; and barcode indicia disposed on an exterior surface of the side walls,
wherein at least a portion of the barcode indicia spiral up and around the longitudinal axis of at least a portion of the exterior surface of the side walls in a rectangular helix pattern,
wherein the barcode indicia contains information regarding the type and amount of liquid for which the container is to be used.

13. The container of claim 12, wherein the barcode indicia extend circumferentially around the exterior of the receptacle.

14. The container of claim 12, wherein the barcode indicia extend part of the way around the side walls of the receptacle.

15. The container of claim 12, wherein the barcode indicia extend from at least one side wall onto the base of the receptacle.

16. The container of claim 12, wherein the barcode indicia are disposed on substantially the entire vertical length of at least one side wall.

17. The container of claim 12, where in the barcode indicia contain information related to at least one of container size, appropriate container contents, or pricing information.

18. The container of claim 12, wherein at least a portion of the barcode indicia are parallel along the longitudinal axis of at least one side wall, such that a first portion of barcode indicia extend parallel to a second portion of barcode indicia that are above or below the first portion.

19. The container of claim 12, wherein at least a portion of the barcode indicia are disposed on the exterior surface of at least one side wall perpendicular to the longitudinal axis.

* * * * *